March 4, 1947.          N. BARBIERI          2,416,976
PICTURE FRAME AND SUPPORT
Filed April 14, 1945
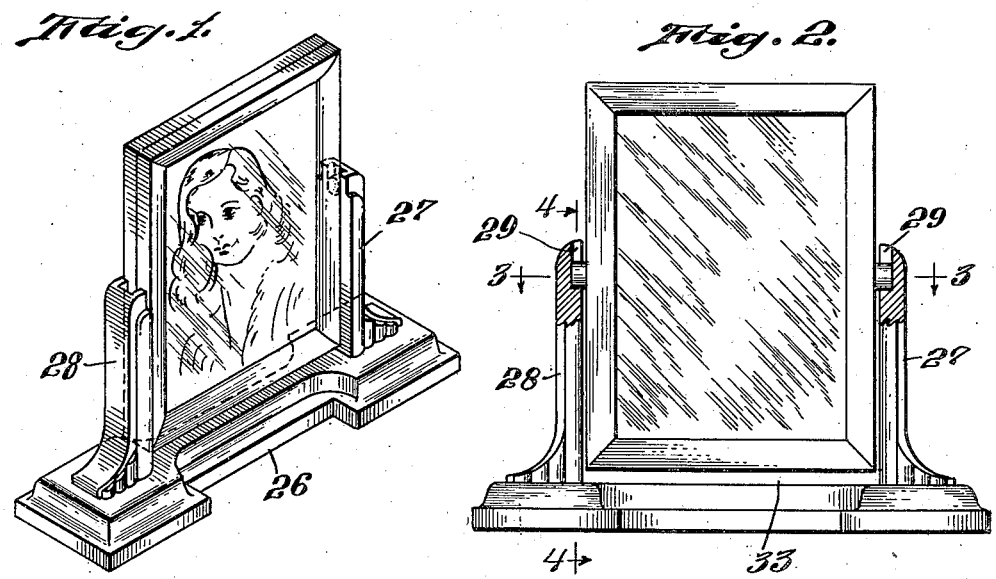
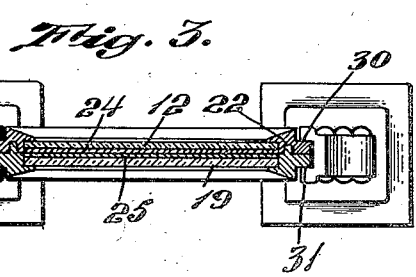
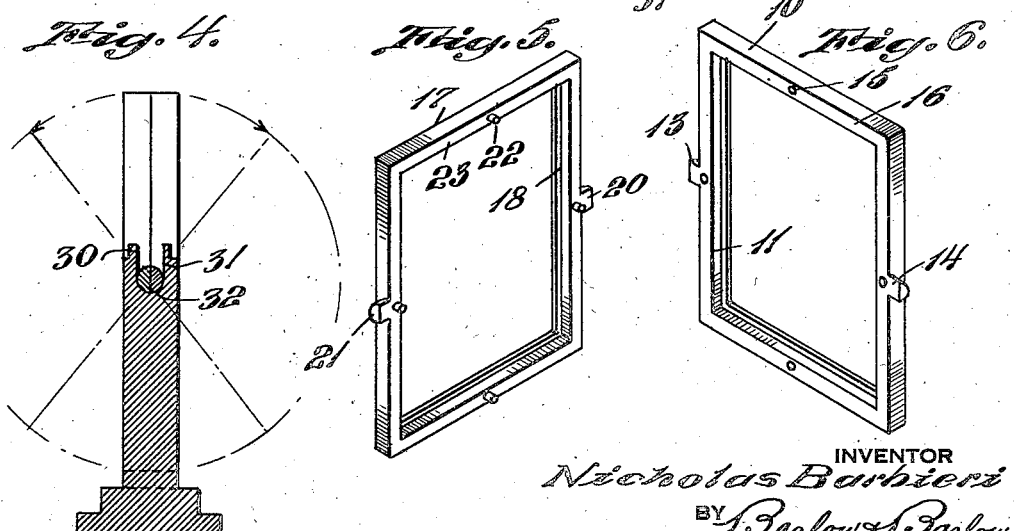
INVENTOR
Nicholas Barbieri
BY Barlow & Barlow
ATTORNEYS Patented Mar. 4, 1947

2,416,976

UNITED STATES PATENT OFFICE 2,416,976

PICTURE FRAME AND SUPPORT

Nicholas Barbieri, Providence, R. I., assignor to Uncas Manufacturing Company, a corporation of Rhode Island Application April 14, 1945, Serial No. 588,299

3 Claims. (Cl. 40—152.1)

This invention relates to a device for mounting a picture or some like structure.

One of the objects of this invention is to provide an inexpensive mounting for a picture or the like by reason of its being simple of manufacture and assembly.

Another object of this invention is to provide a mounting which may present either one of two selected obverse surfaces to be viewed.

Another object of this invention is to provide a structure which may be molded from dies.

Another object of this invention is to provide an arrangement whereby the particular assembly holds the parts in assembled position.

With these and other objects in view, the invention consists of certain novel features of construction, as will be more fully described and particularly pointed out in the appended claims.

In the accompanying drawings:

Fig. 1 is a perspective view of the picture mounting complete;

Fig. 2 is a front elevation partly broken away to show the mounting means;

Fig. 3 is a sectional view on substantially line 3—3 of Fig. 2;

Fig. 4 is a section on substantially line 4—4 of Fig. 2;

Fig. 5 is a perspective view of one of the frame members;

Fig. 6 is a perspective view of the other frame member which cooperates therewith.

In proceeding with this invention I provide two frame members between which there are assembled two pictures which are to be displayed. The frame members have means for locking them so they will not slide one on the other and are also provided with trunnions, part of the trunnion being on one frame member and part on the other frame member. In order to mount this frame rotatably and also in a manner so that the frame members cannot separate one away from the other I provide a base having two upright supports with notches in the ends of the supports of a size so that the edges or walls of the recesses will engage the trunnions. The trunnions are each formed in two parts one part carried by each frame member. When the parts are together the edges or walls prevent separation of the members one from the other.

With reference to the drawings, one frame member is designated 10 and shown in perspective in Fig. 6. It is recessed as at 11 for the reception of a transparent plate 12 and is preferably formed of one piece of molded material. Semi-cylindrical trunnion portions 13 on one side and 14 on the other side of the frame 10 extend from substantially a midpoint thereof while recesses 15 are provided at spaced locations along the surface 16 of the frame which is designed to have face to face contact with its companion frame member.

The other frame member 17 is also provided with a recess 18 so as to receive a transparent plate 19 therein while from opposite edges there extend cylindrical trunnions 20 and 21 from substantially the midpoint of the frame and pins 22 extend from the surface 23 so as to enter the recesses 15 as the surfaces 16 and 23 of the members 10 and 17 are brought into face-to-face contact. The semi-cylindrical trunnions 20 and 13 cooperate to provide one cylindrical trunnion and similarly the portions 14 and 21 cooperate to provide the other cylindrical trunnion. Between the glass plates 12 and 19, back-to-back pictures 24 and 25 in oppositely disposed vertical relation may be provided which will be held between the frame members of glass or transparent plate by reason of the face-to-face contact of these frame members.

In order to mount these frame members with the pictures assembled between them I have provided a base 26 with upwardly extending standards 27 and 28 in spaced relation therefrom. This base and these standards may be all of the same integral piece of material molded of some suitable plastic. At the upper ends of the standards 27 and 28 I provide recesses 29 which will be generally U-shaped with parallel side walls 30 and 31 and a rounded bottom wall 32. The rounded bottom wall 32 will have a radius substantially the radius of each trunnion formed from the portions 13, 20 or 14, 21, while the distance between the side walls 30 and 31 will also be substantially the diameter of the trunnions formed of these combined halves. Thus, when the picture in its frame is mounted in these standards 27 and 28 with the trunnions in the recesses at the upper ends of the standards, the frame members 10 and 17 cannot separate one from the other while these frame members by reason of the pins 22 cannot slide one on the other. Thus, the frame members are held securely in assembled position. The bottom wall 32 of each recess is located at a height so as to support the frame members clear of the base with a space 33 provided between the edge of the frame members and the base which permits of the frame members being located on the trunnion as an axis to be rotated about the trunnions as an axis so as to expose either one side or the other side of the framed pictures to the observer.

It will, of course, be readily apparent that the pictures which are assembled will be oppositely disposed with reference to top and bottom so that when the frame is rotated on the axis of the trunnion the proper viewed position of the picture will be had.

I claim:

1. A picture mounting comprising a base, spaced supports extending upwardly from the base and each provided with a recess at its upper end, a pair of frame members adapted to mount a picture between them when in face-to-face contact, trunnions extending outwardly from said frame members to fit into said recesses and engage the edge walls thereof, said trunnions being in register with each other and partly on one member and partly on the other of said members whereby when in assembled relation and in said recesses the frame members are held in face-to-face contact.

2. A picture mounting as set forth in claim 1 wherein the trunnions are circular in cross section and are located at substantially the middle of said frame members to rotatably mount the frame members.

3. A picture mounting as set forth in claim 1 wherein the trunnions are circular in cross section and are located at substantially the middle of said frame members to rotatably mount the frame members, and the bottoms of said recesses are at a distance from the base greater than from the trunnions to either end of the frame members.

NICHOLAS BARBIERI.

REFERENCES CITED

The following references are of record in the file of this patent:

UNITED STATES PATENTS

| Number | Name | Date |
| --- | --- | --- |
| 1,535,408 | Fricke | Apr. 28, 1925 |
| 1,448,664 | Hull | Mar. 13, 1923 |
| 1,358,000 | Kruschke | Nov. 9, 1920 |
| 1,058,348 | Blumenthal | Apr. 8, 1913 |
| 1,914,068 | Birnn | June 13, 1933 |

FOREIGN PATENTS

| Number | Country | Date |
| --- | --- | --- |
| 449,411 | Collard (British) | June 26, 1936 |